US011059756B1

(12) United States Patent
Morrison et al.

(10) Patent No.: US 11,059,756 B1
(45) Date of Patent: Jul. 13, 2021

(54) PELLETIZED FERTILIZER AND METHODS OF PREPARING PELLETIZED FERTILIZER

(71) Applicants: Intrepid Potash, Inc., Denver, CO (US); EnviroTech Services, Inc., Greeley, CO (US)

(72) Inventors: Michael J. Morrison, Golden, CO (US); Kenneth G. Taylor, Englewood, CO (US); Stephen C. Bytnar, Greeley, CO (US); Elizabeth Paden, Kersey, CO (US)

(73) Assignees: Intrepid Potash, Inc., Denver, CO (US); Enviro Tech Services, Inc., Greeley, CO (US)

( * ) Notice: Subject to any disclaimer, the term of this patent is extended or adjusted under 35 U.S.C. 154(b) by 132 days.

(21) Appl. No.: 16/122,444

(22) Filed: Sep. 5, 2018

Related U.S. Application Data

(63) Continuation-in-part of application No. 15/264,373, filed on Sep. 13, 2016, now abandoned.
(Continued)

(51) Int. Cl.
*C05D 1/00* (2006.01)
*B01J 2/30* (2006.01)
(Continued)

(52) U.S. Cl.
CPC ............... *C05D 1/005* (2013.01); *B01J 2/003* (2013.01); *B01J 2/30* (2013.01); *C05G 5/38* (2020.02); *C08L 1/10* (2013.01)

(58) Field of Classification Search
CPC .. C05D 1/005; C05G 5/38; B01J 2/003; B01J 2/30; C08L 1/10
See application file for complete search history.

(56) References Cited

U.S. PATENT DOCUMENTS 3,620,709 A   11/1971  Petkovsek et al.
4,385,920 A   5/1983   Dancy et al.
(Continued)

FOREIGN PATENT DOCUMENTS

WO   91/09818 A1   7/1991
WO   2014/095797 A1   6/2014

OTHER PUBLICATIONS

Carlson, Carrie Le Capitaine, Shane. Rotary Drum or Pelletizing Disc. FEECO International, Inc <http://feeco.com/rotary-drum-or-pelletizing-disc/> (Year: 2012).
(Continued)

*Primary Examiner* — Jennifer A Smith
(74) *Attorney, Agent, or Firm* — TraskBritt (57) ABSTRACT

A method of forming a pelletized fertilizer includes combining a fertilizer material with an organic binder to form a wet mixture, and drying the wet mixture to form particles comprising the fertilizer material and the organic binder dispersed therein. The fertilizer material includes solid particles of langbeinite, and the organic binder includes at least one cellulose polymer in a solid phase or a liquid gel phase. The dried particles are coated with mineral oil to form coated particles. A pelletized fertilizer includes pellets comprising solid particles of langbeinite (and optionally, other fertilizer materials) interspersed with at least one cellulose polymer. A mineral oil coating is over the pellets.

18 Claims, 2 Drawing Sheets

Related U.S. Application Data (60) Provisional application No. 62/234,506, filed on Sep. 29, 2015.

(51) Int. Cl.
  *B01J 2/00* (2006.01)
  *C05G 5/30* (2020.01)
  *C08L 1/10* (2006.01)

(56) References Cited

U.S. PATENT DOCUMENTS

| | | | |
|---|---|---|---|
| 4,941,943 | A | 7/1990 | Edelman et al. |
| 5,306,478 | A | 4/1994 | Hayati et al. |
| 5,472,476 | A | 12/1995 | Schapira et al. |
| 5,772,721 | A | 6/1998 | Kazemzadeh |
| 6,071,325 | A | 6/2000 | Schmitt |
| 6,193,775 | B1 | 2/2001 | Fujita et al. |
| 6,387,145 | B1 | 5/2002 | Miele et al. |
| 6,468,442 | B2 | 10/2002 | Bytnar |
| 6,852,247 | B2 | 2/2005 | Bytnar |
| 7,157,021 | B2 | 1/2007 | Bytnar et al. |
| 7,563,386 | B2 | 7/2009 | Bytnar |
| 7,632,421 | B2 | 12/2009 | Bytnar |
| 7,931,728 | B2 | 4/2011 | Brosse et al. |
| 7,947,193 | B2 | 5/2011 | Bytnar et al. |
| 7,998,505 | B2 | 8/2011 | Thoorens et al. |
| 8,802,048 | B2 | 8/2014 | Chastain et al. |
| 8,808,572 | B2 | 8/2014 | Trujillo et al. |
| 8,945,667 | B2 | 2/2015 | Bytnar et al. |
| 2002/0125459 | A1 | 9/2002 | Bytnar |
| 2003/0085376 | A1 | 5/2003 | Bytnar |
| 2003/0107022 | A1 | 6/2003 | Bytnar |
| 2004/0191401 | A1 | 9/2004 | Bytnar et al. |
| 2005/0001198 | A1 | 1/2005 | Bytnar |
| 2006/0175574 | A1 | 8/2006 | Bytnar |
| 2006/0226051 | A1 | 10/2006 | Navarrette et al. |
| 2007/0295932 | A1 | 12/2007 | Bytnar |
| 2010/0009073 | A1 | 1/2010 | Bytnar et al. |
| 2010/0297358 | A1 | 11/2010 | Bytnar et al. |
| 2013/0306904 | A1 | 11/2013 | Trujillo et al. |
| 2014/0072507 | A1 | 3/2014 | Chastain et al. |
| 2014/0332611 | A1 | 11/2014 | Morrison et al. |
| 2014/0334995 | A1 | 11/2014 | Chastain et al. |
| 2014/0346260 | A1 | 11/2014 | Kaps et al. |
| 2016/0229763 | A1* | 8/2016 | Wheeler ............... C05C 11/00 |

OTHER PUBLICATIONS

Aqualon "Physical and Chemical Properties" Booklet 250-10H REV. 4-02, Hercules Incorporated, 1999, Washington, DE, 30 Pages.

* cited by examiner

PELLETIZED FERTILIZER AND METHODS OF PREPARING PELLETIZED FERTILIZER

CROSS REFERENCE TO RELATED APPLICATION

This application is a continuation-in-part of U.S. patent application Ser. No. 15/264,373, filed Sep. 13, 2016, which claims priority of U.S. Provisional Application Ser. No. 62/234,506, filed Sep. 29, 2015, the entire disclosure of each of which is hereby incorporated herein by this reference.

FIELD

Embodiments of the present disclosure relate generally to methods and systems for forming pelletized fertilizer, and fertilizers formed by such methods and systems.

BACKGROUND

Commercial fertilizers are available in various forms, such as in liquid form, as pellets (i.e., granules), as naturally occurring particles sized through a mining and milling process, or as powders. Powders can present material-handling problems due to differences in flow properties based on the particle size distribution of the powders. Reliably controlling the amount of powder applied can be difficult. Furthermore, dust from powdered fertilizers can present hazards in the form of respiratory hazards, eye irritants, etc.

Thus, fertilizer consumers may prefer to have solid fertilizer in pellet or granule form. Pellets can be easily handled without generating excessive dust. Pellets can be easily mixed with other similarly sized pellets if a combination of different fertilizers is deemed appropriate for a given application.

Wet granulation is a process used to obtain granular fertilizers using agglomeration without compression. A powder and water are typically fed into an agitator (e.g., a drum granulator, a pin granulator, or a pan granulator). The agitator mixes the materials, causing the particles to stick together. The materials form agglomerates having a generally spherical shape as they roll and adhere to each other. Wet granulation techniques convert powdered materials into sizes desirable for agriculture and other applications.

Fertilizer pellets can be formed from powdered material by mixing the powdered material with a binder and water, agglomerating the material as described above, and removing the water. The binder remains a part of the pellets, and typically dilutes the target nutrients in the pellets by the amount of the binder. Binder is somewhat analogous to packaging, in that binder adds material and processing costs (e.g., transportation and storage), but, depending on the material used, may add little to the value consumers place on the product, other than its ability to provide the product into a usable form. Thus, it would be beneficial to provide a method of pelletizing fertilizer that decreases the amount of binder used while retaining the benefits the binder provides.

BRIEF SUMMARY

In some embodiments, a method of forming a pelletized fertilizer includes combining a fertilizer material with an organic binder or mixture of binders to form a wet mixture and drying the wet mixture to form dried particles comprising the fertilizer material and the organic binder dispersed therein. The fertilizer material includes solid particles of langbeinite, and the organic binder includes at least one cellulose polymer in a solid phase or a liquid gel phase. The dried particles are coated with mineral oil to form coated particles. The fertilizer material may optionally include additional materials, such as KCl, polyhalite, kieserite, micronutrients, or secondary nutrients.

A method of forming a pelletized fertilizer includes combining solid particles of langbeinite (and optionally, other fertilizer materials) with moisture (e.g., water and/or brine) and a binder material comprising at least one cellulose polymer to form a wet mixture; forming particles of the wet mixture using equipment designed for this purpose (e.g., rotating drum, pan pelletizer, etc.); and drying the particles to form a pelletized material comprising the solid particles of langbeinite interspersed with the organic binder.

In certain embodiments, a pelletized fertilizer includes pellets comprising solid particles of langbeinite (and optionally, other fertilizer materials) interspersed with at least one cellulose polymer. A mineral oil coating is over the pellets.

A fertilizer granule includes a mixture of a fertilizer material and an organic binder. The fertilizer material comprises solid particles of langbeinite (and optionally, other fertilizer materials), and the organic binder comprises at least one cellulose polymer. The fertilizer granule may be coated with another binder or with another organic material such as mineral oil. The organic binder or mixture comprises less than about 2% by weight of the fertilizer granule.

DETAILED DESCRIPTION

Novel systems and processes for preparing pelletized fertilizer are described herein. Processes may include, for example, combining a powdered or crushed fertilizer material with an organic binder and brine or water to form a wet mixture, and drying the wet mixture to form particles of the fertilizer material interspersed with the organic binder. The fertilizer material may include potassium sulfate and magnesium sulfate, such as langbeinite, and may optionally include other fertilizer materials or nutrients. The organic binder may include cellulose ether or another cellulose polymer in a solid phase or a liquid gel phase.

The illustrations presented herein are not actual views of any particular process, system, or material, but are merely idealized representations that are employed to describe example embodiments of the present disclosure.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

As used herein, the term "particle size" means and includes a largest linear dimension of a particle (sometimes referred to as "diameter"). As used herein, "average size" and "average particle size" refer to the number-average particle size based on the largest linear dimension of each particle of a group of particles. Particle size, including average, maximum, and minimum particle sizes, may be determined by an appropriate method of sizing particles such as, for example, static or dynamic light scattering (SLS or DLS) using a laser light source, physical classification such as screening, or any other appropriate method. Accurate measurement of particle sizes may depend on the size range of the particles to be measured.

As used herein, particular mineral names (e.g., langbeinite) may refer to as-mined minerals, minerals physically or chemically separated from as-mined minerals, or crystallized solids formed (e.g., crystallized) in industrial processes. Particular minerals described herein may be substantially pure or may be mixed with other materials or contaminants.

Figure 1:
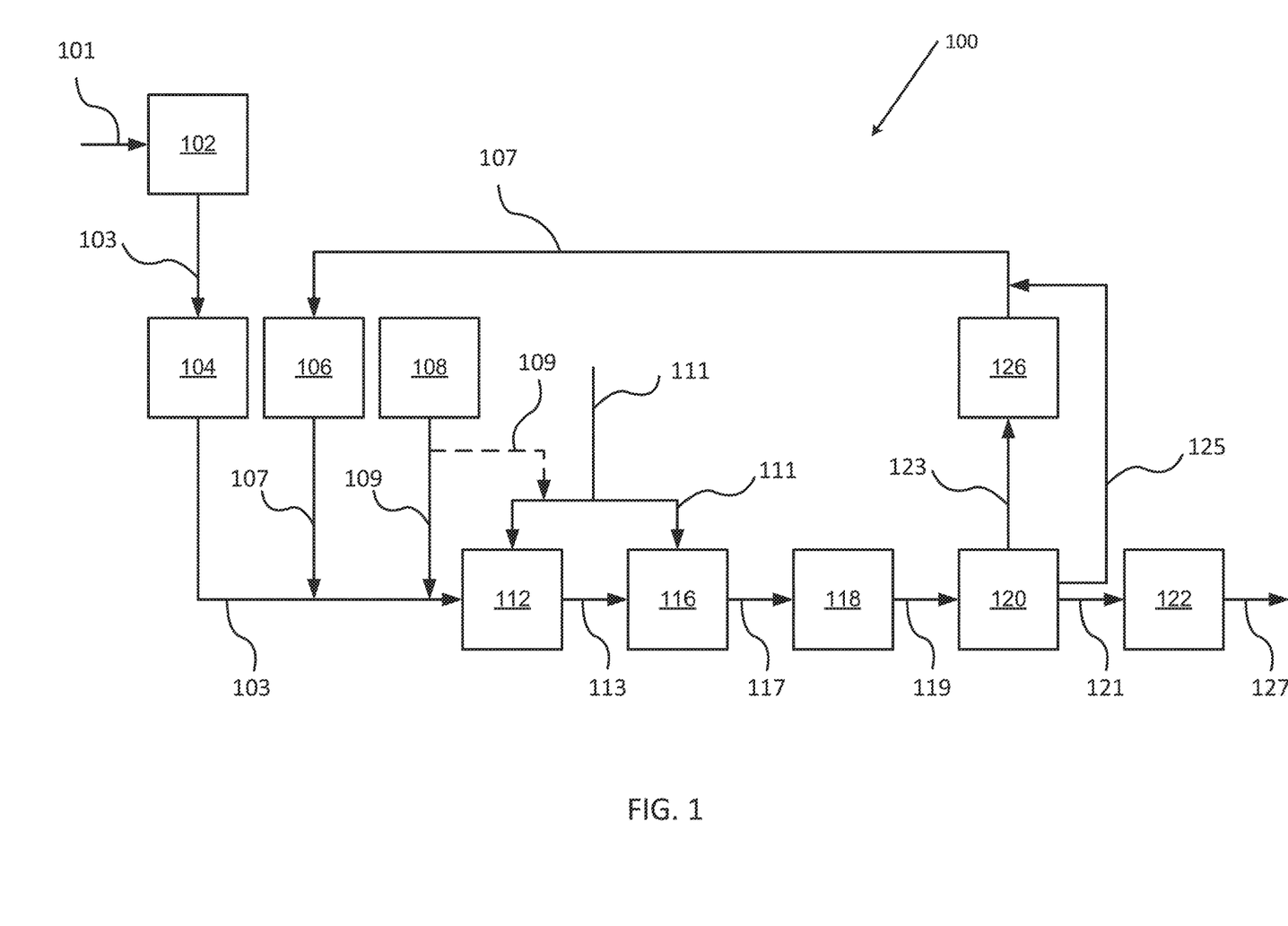
FIG. 1 is a simplified block flow diagram illustrating a system and method for forming a pelletized fertilizer according to the present disclosure.

FIG. 1 is a simplified block flow diagram illustrating a system 100 for forming a pelletized fertilizer. To simplify the figures and clarify the present disclosure, not every element or component of system 100 is shown or described herein. System 100 may also include appropriate conveyors, piping, connectors, sensors, controllers, etc., as will be understood by those of ordinary skill in the art.

In the system 100, a raw fertilizer 101 may be provided to a crusher 102. The raw fertilizer 101 may include, for example, langbeinite (i.e., a potassium-magnesium-sulfate mineral having the formula $K_2Mg_2(SO_4)_3$), schoenite $(K_2Mg(SO_4)_2 \cdot 6H_2O)$, leonite $(K_2Mg(SO_4)_2 \cdot 4(H_2O))$, potassium sulfate $(K_2SO_4$, also known as arcanite), or any other material useful for fertilizer. The raw fertilizer 101 may be in the form of solid particles or a mixture of solid particles with a liquid.

The crusher 102 may be configured to comminute the raw fertilizer 101 into smaller particle sizes. For example, the crusher 102 may be configured to produce a crushed fertilizer 103 having a maximum particle size of about 6 mm or less, about 3 mm or less, about 1 mm or less, about 0.2 mm or less, about 0.1 mm or less, about 0.01 mm or less, about 1.0 μm or less, or even about 0.1 μm or less. Different particle sizes may yield different processing characteristics (e.g., different specific surface area, different physical strength, etc.) and wide particle size distributions may yield different properties than narrow particle size distributions. The crusher 102 may typically produce a distribution of particle sizes, including larger particles (which may also be referred to as grains) and fines (which may also be referred to as dust). The crusher 102 may be any equipment configured to apply a force to the raw fertilizer 101, such as an impact crusher (e.g., a cage paktor or hammer mill), vibratory rod mill crusher, ball mill crusher, roller mill, or any combination of equipment. The crusher 102 may also include means for classifying and/or recycling material to yield a selected particle size distribution. Crushers and classifiers are generally known in the art, and their principles of operation are not discussed in detail herein.

The crushed fertilizer 103 may be transferred (e.g., by a conveyor belt, a chute, etc.) from the crusher 102 to a hopper 104 (or bin) for temporary storage. The hopper 104 may be sized and configured to contain a supply of the crushed fertilizer 103 sufficient to allow the system 100 to continue operating for a period of time while operations upstream or downstream of the hopper 104 are temporarily interrupted. The hopper 104 may be configured to allow the crushed fertilizer 103 to flow from the hopper 104 with little or no external force. For example, the hopper 104 may be at least partially in the shape of an inverted cone, and the crushed fertilizer 103 may flow through a bottom tip of the cone when a valve is opened.

Additional hoppers 106, 108 may store other materials, such as recycled fertilizer 107 and a binder 109, or any other selected feed ingredients. The hoppers 106, 108 may have any size and shape appropriate for the materials contained therein, and may have a design similar to or different from the hopper 104. For example, the hopper 108 for storing the binder 109 may be a cylindrical liquid storage tank, and may include a pump or other means to transfer the binder 109 therefrom as needed.

The crushed fertilizer 103 may be transferred to a blender 112, optionally with the recycled fertilizer 107, the binder 109, and/or a binding fluid 111. The blender 112 may mix the materials to form a wet mixture 113. The blender 112 may be of any size and design capable of handling the materials, such as a drum mixer, a cone blender, a paddle mixer, etc. The blender 112 may mix the material until the binder 109 is approximately uniformly dispersed in the crushed fertilizer 103 and/or the recycled fertilizer 107. The blender 112 may be configured to densify particles to improve process control and properties of end products. In some embodiments, the binder 109 may be mixed with the binding fluid 111 (indicated by a dashed arrow in FIG. 1) before entering the blender 112. In other embodiments, the binder 109 may enter the blender 112 as a dry solid. The binding fluid 111 may be sprayed into the blender 112 to facilitate even application onto the solid materials. In some embodiments, the crushed fertilizer 103, the recycled fertilizer 107, and/or the binder 109 may be at least partially mixed while dry, and the binding fluid 111 may then be added to the dry mixture.

The binder 109 may include an organic material containing one or more cellulose ethers or another cellulose polymer. For example, the binder 109 may include a water-soluble polymer such as sodium carboxymethyl cellulose (CMC) ether. Such polymers are currently available from Ashland Inc. of Covington, Ky., under the name AQUALON® cellulose gum. Sodium CMC is generally of the structure of a cellulose molecule, having cellobiose units in a polymeric chain, with each cellobiose unit having two anhydroglucose units. Sodium CMC includes sodium carboxylmethyl groups substituted for hydrogen in some hydroxyl groups of the cellulose molecules. The degree of substitution of sodium CMC is defined as the average number of sodium carboxymethyl groups per anhydroglucose unit (with 3.0 being the theoretical maximum, because each anhydroglucose unit of a cellulose molecule has three hydroxyl groups). The binder 109 may include sodium CMC having a degree of substitution from about 0.7 to about 1.5, such as from about 0.9 to about 1.2. In some embodiments, the binder 109 may include sodium CMC having a degree of substitution greater than about 1.0 or even greater than about 1.2. A binder 109 having a lower degree of substitution may not activate as desired in a high-salt environment, or may require more fluid to mix with solids (i.e., the crushed fertilizer 103 and/or the recycled fertilizer 107) than a binder 109 having a higher degree of substitution. The binder 109 may include, on a dry basis, at least 99.5% sodium CMC, though binder 109 of any purity may be selected. The binder 109 may have a bulk density from about 0.70 g/ml to about 0.80 g/ml, such as about 0.75 g/ml.

In some embodiments, the binder 109 may include water-soluble methylcellulose or hydroxypropyl methylcellulose polymers. Such polymers are available from Dow Chemical Company, of Midland, Mich., under the name METHO-CEL™ cellulose ethers. Other materials that may be suitable for the binder 109 include poly vinyl alcohol, xanthan gum, carbomers, and other gums.

The binder 109 may be mixed with the binding fluid 111, either in the blender 112 or before entering the blender 112. The binding fluid 111 may be water or a brine. For example, ions of a brine may amplify the binding effect of the binder 109, which effect may increase with the ionic strength of the brine. Mixing the binder 109 with the binding fluid 111 before mixing the binder 109 with the crushed fertilizer 103 may allow the binder 109 to more evenly and thoroughly mix within the blender 112. The viscosity of the mixture may vary based on the composition of the binder 109 and the binding fluid 111, as well as the relative amounts of each. For example, a mixture of 2% of a sodium CMC in water may have a viscosity from about 1,500 centipoise to about 17,000 centipoise, depending in part on the degree of substitution of the sodium CMC. If the binding fluid 111 is a brine, ions of the brine may form a chelate complex with the binder 109, which may tend to increase the viscosity of the mixture. In such embodiments, nutrients within the brine (e.g., micronutrients such as boron, iron, cobalt, chromium, copper, iodine, manganese, selenium, zinc, or molybdenum; or secondary nutrients such as sulfur, calcium, or magnesium) may become bound with the binder 109.

The binder 109 may remain in a solid phase (e.g., as a suspension), or may absorb water to become a hydrated gel material. In some embodiments, the binder 109 may also include a sugar, such as glucose or dextrose, a starch, or a compound including one or more ligands. For example, a sugar, starch, or compound including ligands may increase the viscosity of the binder 109 and/or the binding fluid 111. The binder 109 may, once dried, function as a plasticizer, increasing the strength and/or durability of the pellets.

The binding fluid 111 may include water and/or another ingredient. In some embodiments, the binding fluid 111 may include a soluble salt (e.g., NaCl, KCl, $MgSO_4$, $K_2SO_4$, MgCl, etc.), a mineral, micronutrients, or any mixture thereof, such that the binding fluid 111 has a specific gravity from 1 to about 1.5, such as from about 1 to about 1.25 or from about 1.05 to about 1.20. The amount and identity of salts and minerals in the binding fluid 111 may influence the product formed in the process, such as by changing physical properties or by changing the chemical species (e.g., as nutrients) in the final product.

The wet mixture 113 may leave the blender 112 and enter a pelletizer 116 configured to form the wet mixture 113 into wet particles 117 as agglomerations. In some embodiments, the crushed fertilizer 103 may be transferred directly to the pelletizer 116, without passing through a separate blender 112. The pelletizer 116 may include various equipment known in the art to form pellets or agglomerations, such as a rotating drum, a pan pelletizer, a pin pelletizer, etc. The wet particles 117 may tumble and abrade against one another such that the wet particles 117 may tend to be in generally spherical form. The wet particles 117 may have a wide distribution of particle sizes, but a peak in the mass of the wet particles 117 may be in a range from about 0.5 mm to about 10.0 mm, such as from about 1.0 mm to about 5.0 mm.

In some embodiments, a portion of the binding fluid 111 may be added to the pelletizer 116 while the wet mixture 113 is being formed into the wet particles 117. The binding fluid 111, if added at this point, may help to bind smaller portions of material that break away from larger particles (e.g., corners or protrusions that break away from larger agglomerations). Thus, by adding binding fluid 111 to the pelletizer 116, the resulting wet particles 117 may be generally larger and/or more uniformly sized.

The wet particles 117 may be dried in a dryer 118, wherein moisture from the wet particles 117 evaporates, forming dried pelletized fertilizer 119. The dryer 118 may be operated or configured to reduce breakage of the wet particles 117. For example, the operating temperature of the dryer 118 may be selected to be below a decomposition temperature of components of the binder 109. The dryer 118 may include, for example, a pan dryer, a rotary drum, a tray dryer, a belt dryer, etc. In some embodiments, the dryer 118 may be integrated with the pelletizer 116. In other embodiments, the dryer 118 may be separate from the pelletizer 116. The dryer 118 may dry the wet particles 117 by passing heated and/or dried air adjacent to the wet particles 117. In some embodiments, the dryer 118 may be a passive system, such as an open tray or pan, and may rely on, e.g., solar energy, wind, or other means to cure and/or dry the wet particles 117.

The dried pelletized fertilizer 119 may be separated into various size ranges by one or more screens 120. In some embodiments, the screens 120 may include two screens. For example, the dried pelletized fertilizer 119 may be transferred to a first screen. The first screen may separate an oversize material 123, which does not pass through the first screen, from the remainder of the dried pelletized fertilizer 119. The remainder may be transferred to a second screen. The second screen may separate a fertilizer product 121, which does not pass through the second screen, from fine material 125, which does pass through the second screen. The first and second screens may be selected such that the fertilizer product 121 has particles within any selected size range. The particle size range of the fertilizer product 121 may be selected to meet commercial demand.

For example, in some embodiments, the fertilizer product 121 may include particles having a mean particle size from about 0.1 mm to about 20 mm, such as from about 0.5 mm to about 10 mm, or from about 1 mm to about 5 mm. The particle size of granulated fertilizers may be expressed in terms of a sizing guide number (SGN), which is defined as particle diameter in millimeters times 100. For example, particles 2.5 mm in diameter would have an SGN of 250. In some embodiments, the fertilizer product 121 formed as described herein may have an SGN between about 270 and about 290. Material not having such an SGN may be recycled as the oversize material 123 and the fine material 125. Of course, the process may be modified to produce a fertilizer product 121 having any selected SGN, based on market or other conditions, by changing the mesh size of the screens 120. Oversize material 123 and fine material 125 may be processed as described below.

The fertilizer product 121 may be coated in a coater 122 to form coated particles 127. In some embodiments, the coater 122 may apply another binder or other coating material over the outer surfaces of the fertilizer product 121. In some embodiments, the coater 122 may apply mineral oil over the outer surfaces of the fertilizer product 121. The fertilizer product 121 may be coated while still wet, immediately after the fertilizer product 121 is dried, or later. In some embodiments, the fertilizer product 121 may be stored for an extended period before being coated and/or may be moved to another location or facility for coating in the coater 122. In some embodiments, the coater 122 may include a roller, rotary, or vibratory mill in conjunction with a reservoir to apply a liquid coating to the outer surfaces of the fertilizer product 121. In some embodiments, the coater 122 may include a sprayer to apply a liquid coating to the outer surfaces of the fertilizer product 121. Spray may be applied before or after the fertilizer product 121 completes the drying process. In some embodiments, the sprayer may be an air sprayer, a hydraulic sprayer, an electrostatic sprayer, or another kind of sprayer. In some embodiments, the coater 122 may apply the coating in a single application. In other embodiments, the coating may be applied in multiple applications. The total weight of the coating on the outer surfaces of the coated particles 127 may be between 0.05% and 1.0% of the total weight of the coated particles 127. For example, the total weight of the coating may be between 0.05% and 0.2% of the total weight of the coated particles 127.

The coated particles 127 may include from about 0.05% to about 2.0% binder by weight, such as from about 0.2% to about 1.0% binder by weight, or from about 0.3% to about 0.6% binder by weight. The coated particles 127 may include from about 90% fertilizer material (e.g., langbeinite, leonite, kainite, polyhalite, kieserite, KCl, etc.) by weight to about 97% fertilizer material by weight, such as from about 92% fertilizer material by weight to about 95% fertilizer material by weight. The fertilizer product 121 may include other impurities, such as halite, that do not add to the fertilizer value (e.g., the percent $K_2O$), but that are naturally present in the production or processing the raw fertilizer 101.

The fertilizer product 121 may be substantially homogeneous, such that the binder 109 and the fertilizer material are uniformly interspersed in the fertilizer product 121. Though the fertilizer material may be in the form of agglomerated grains, the binder 109 may coat the grains or otherwise be present at boundaries between adjacent grains of the fertilizer material.

Figure 2:
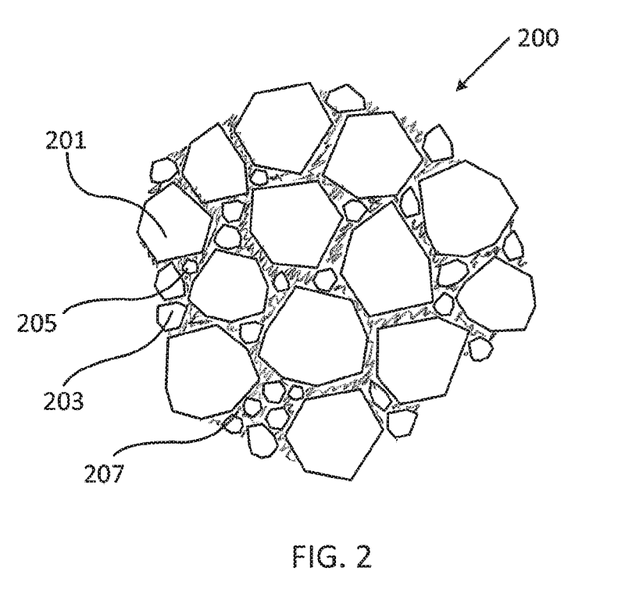
FIG. 2 is a simplified schematic diagram illustrating how a cross-section of a fertilizer granule produced as described herein may appear under magnification.

FIG. 2 is a simplified schematic diagram illustrating how a cross-section of a granule 200 of the fertilizer product 121 may appear under magnification. The granule 200 may include interspersed particles 201, 203, 205 of fertilizer material that form a three-dimensional network. Optionally, in some embodiments, the particles 201, 203, 205 of the fertilizer material may have a multimodal grain size distribution. For example, the fertilizer material may include larger particles 201 (grains), intermediate particles 203, and smaller particles 205 (dust). The larger particles 201, for example, may have average particle dimensions (e.g., mean diameters) of less than 3 mm, less than 1 mm, or less than 0.1 mm. The intermediate particles 203, for example, may have average particle dimensions of less than 1 mm, less than 0.1 mm, or even less than 0.01 mm. The smaller particles 205, for example, may have average particle dimensions of less than 0.01 mm, less than 1 µm, or even less than 0.1 µm. Note that FIG. 2 is not intended to convey any particular relative sizes of the particles 201, 203, 205 (i.e., FIG. 2 is not necessarily drawn to any particular scale).

Interstitial spaces between the particles 201, 203, 205 may be at least partially filled with a binder 207, which may include the binder 109 described above and/or a component of the binding fluid 111 (e.g., crystallized ions from the binding fluid 111). Effective binders 207 may have a broad composition range. In some embodiments, the binder 207 may include from about 50% to about 100% cellulose polymer by weight, and from about 0% to about 50% of a salt by weight. For example, the binder 207 may include about 70% sodium CMC by weight and about 30% NaCl by weight. The binder 207 may also include other materials, such as impurities, micronutrients, etc.

The binder 207 may substantially coat some of the particles 201, 203, 205, and the binder 207 may be dispersed throughout the granule 200. The binder 207 may promote adhesion of the particles 201, 203, 205 to one another into a stable mass generally capable of retaining its shape during transport and application of the fertilizer product 121. In some embodiments, the interstitial spaces may include empty voids among the particles 201, 203, 205 in which there is no solid or liquid substance (although a gas, such as air, may be present in the voids). For example, voids may form as water evaporates. The binder 207 may coat substantially all the surfaces of the particles 201, 203, 205 within the granule 200. The binder 207 may form a salt bridge connecting adjacent particles 201, 203, 205 in a continuous matrix of the binder 207, which may tend to increase strength of the granules 200.

Figure 3:
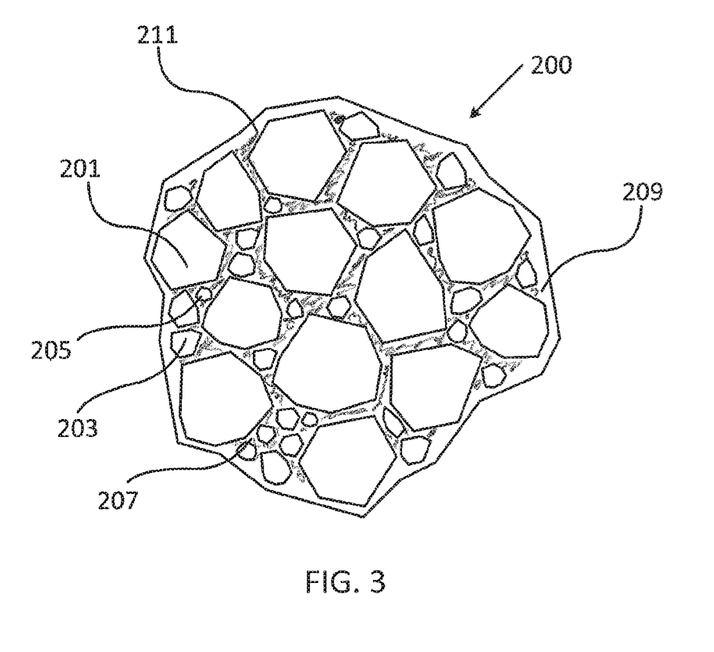
FIG. 3 is a simplified schematic diagram illustrating how a cross-section of a fertilizer granule produced as described herein and coated with a coating may appear under magnification.

FIG. 3 is a simplified schematic diagram illustrating how a cross-section of a granule 200 of the fertilizer product 121 coated with a coating material may appear under magnification. The granule 200 may include interspersed particles 201, 203, 205 of fertilizer material that form a three-dimensional network. In some embodiments, some of the binder 207 may coat exterior surfaces 211 of the granules 200, which may also tend to increase strength of the granules 200. In some embodiments, the granules 200 may have a coating 209 of the binder 207 or of another material, which may be applied after the pelletizing process (e.g., after drying) to further increase strength of the granules 200.

The coating 209 on the granules 200 may have several advantages. In some embodiments, the coating 209 may tend to increase the strength of the granules 200, which may decrease the quantity of broken granules 200, improving the consistency and handling of the bulk fertilizer as it is produced, transported, stored, and used. In some embodiments, the coating 209 over the fertilizer granules 200 may also reduce the amount of dust created as the bulk fertilizer is produced, transported, stored, and used. In some embodiments, the coating 209 may tend stabilize the fertilizer granules 200 in humid, hot, or other environments, and may limit or prevent agglomeration of multiple fertilizer granules 200 (e.g., caking or clumping of the fertilizer). Typically, cakes and/or clumps in the fertilizer tend to be too large to be used in machinery and spreading equipment designed to handle smaller sized granules or pellets. Thus, fertilizer with cakes and clumps cannot be used effectively without being broken down. In some embodiments, the coating 209 may tend to slow the chemical interaction of the fertilizer granules as they are applied, thus reducing the risk of burning or otherwise negatively impacting growing plants.

In some embodiments, the coating 209 may be an organic material such as the binder 207 or another binder. In some embodiments the coating 209 may be a mineral oil. Mineral oil is an odorless, colorless, product of petroleum composed mainly of alkanes and cycloalkanes that has a specific gravity of about 0.8. g/ml. Mineral oil may include minor amounts of other hydrocarbons including aromatic and/or naphthenic hydrocarbons. Mineral oil typically comprises hydrocarbon molecules having 15-50 carbon atoms. Light mineral oils typically are mostly made up of hydrocarbon molecules comprising 15-30 carbon atoms. Heavy mineral oils typically are mostly made up of hydrocarbon molecules comprising 30-50 carbon atoms. In some embodiments, the coating 209 may comprise a light mineral oil, a heavy mineral oil, or a combination of both. In some embodiments, the coating may comprise more than one type of material; such as a binder and a mineral oil or a mineral oil and another material. In some embodiments, the coating may comprise three or more materials.

The fertilizer granules 200 may be coated while still wet, immediately after they are dried, or later. In some embodiments, the fertilizer granules 200 may be stored for an extended period before being coated and/or may be moved to another location or facility for coating. In some embodiments, the coating 209 may be applied in a roller, rotary, or vibratory mill configured with a reservoir to apply a liquid to the outer surfaces of the fertilizer granules 200. In some embodiments, the coating 209 may be applied as a spray. In some embodiments, the spray may be applied before or after the fertilizer granules 200 complete the drying process. In some embodiments, the sprayer may be an air sprayer, a hydraulic sprayer, an electrostatic sprayer, or another kind of sprayer. In some embodiments, the coating 209 may be applied in a single application. In some embodiments, the coating 209 may be applied in multiple applications. The total weight of the coating on the outer surfaces of the fertilizer product 121 may be between 0.05% and 1.0% of the total weight of the fertilizer product 121. The total weight of the coating may be between 0.05% and 0.2% of the total weight of the fertilizer product 121.

The particles 201, 203, 205 may be at least about 98.0%, at least about 99.0%, or even at least about 99.5% of the mass of the granule 200. The binder 207 may be about 2.0% or less, about 1.0% or less, or even about 0.5% or less of the mass of the granule 200.

It has been unexpectedly observed that granules 200 of fertilizer product 121 formed as described herein exhibit physical strength and cohesion comparable to conventional fertilizers having a much higher concentration of binder. For example, the fertilizer product 121 may have properties comparable to a conventional fertilizer having about 3% binder by weight or more. The fertilizer product 121 may perform as well as conventional fertilizer in physical degradation tests. For example, a physical degradation test may be performed by tumbling a sample of pelletized fertilizer retained by a 14-mesh screen in a rotary mill for 5 minutes. The mass of material that passes through the 14-mesh screen after tumbling may be defined as the degradation. The fertilizer product 121 (e.g., having 0.5% binder) may experience about 14% degradation or less, a value that may be comparable to conventional fertilizer having about 3% binder.

By limiting the amount of the binder 109 in the fertilizer product 121, the costs of the binder 109 can be decreased and the mass fraction of nutrients can be increased. Thus, the fertilizer product 121 as described herein may have lower production costs and a higher quality than conventional fertilizers.

Purity of the fertilizer product 121 may influence the value thereof. For example, fertilizers may typically be sold based on minimum specified concentrations of particular nutrients. The processes disclosed herein may be used to achieve such concentrations because the amount of binder 109, 207 in the final product may be lower than conventional processes. Therefore, the fertilizer product 121 or granules 200 may command a higher price than fertilizers with conventional binders.

Furthermore, fertilizer purity may improve effectiveness of the fertilizer product 121, such that a smaller quantity of the fertilizer product 121 may be required for a given application, in comparison with conventional fertilizers.

Referring again to FIG. 1, the oversize material 123 and the fine material 125 separated from the fertilizer product 121 by the screens 120 may be recycled within the system 100. For example, the oversize material 123 may be crushed in a crusher 126 to form a portion of the recycled fertilizer 107. The crusher 126 may be configured or operated to obtain a selected discharge size or quality (e.g., moisture content). The fine material 125 may also form a portion of the recycled fertilizer 107. The recycled fertilizer 107 may be transferred to the hopper 106 to be reprocessed with the crushed fertilizer 103. This recycled fertilizer 107 may act as seeding material in the formation of nuclei for agglomeration of fertilizer.

The properties of the fertilizer product 121 may depend on various factors, such as (1) the degree of substitution of the binder 109, (2) the viscosity of the binder 109, (3) the grain size(s) of the crushed fertilizer 103; and (4) the composition of the binding fluid 111. More highly substituted binders 109 appear to be generally easier to process because they tend to hydrate faster than less-substituted binders. For example, sodium CMC with a degree of substitution of at least 1.0 or at least 1.2 has been observed to produce consistent product.

Without being bound to any particular theory, higher viscosity binder 109 appears to produce fertilizer product 121 having higher green strength than lower viscosity binders, which allows them to survive handling better. For example, a binder 109 having a viscosity of at least 1,500 centipoise, or at least 17,000 centipoise, in a 2% solution in water, has been observed to produce consistent product. It should be noted, however, that low-viscosity binders appear to increase the strength of finished (i.e., dried and cured) fertilizer granules, whereas high-viscosity binders appear to increase the strength of wet fertilizer granules. Thus, depending on the fertilizer product, and in which state additional strength is desired, a high- or low-viscosity binder 109 may be selected. In some embodiments, a mixture of both a high-viscosity and a low-viscosity binder 109 may be selected to combine the beneficial properties of each and tailor the properties of the fertilizer product 121. In some embodiments, the outer surfaces of fertilizer product 121 formed as described herein may be coated in the coater 122 described above.

Fine grains of the crushed fertilizer 103 appear to produce a fertilizer product 121 with relatively more uniform distribution of the binder 109. For example, crushed fertilizer 103 with a mean particle size of less than about 0.1 mm or even less than about 1.0 μm may form consistent product strong enough to withstand handling conditions. Multimodal particle size distributions may increase packing fraction while retaining the benefits of uniform distribution of the binder 109.

As discussed above, the composition of the binding fluid 111 (e.g., water or brine) may affect the final product. In particular, a brine appears to increase the binding strength of the binder 109.

Additional non-limiting example embodiments of the disclosure are described below.

Embodiment 1: A method of forming a pelletized fertilizer, comprising combining solid particles of langbeinite with an organic binder to form a wet mixture, drying the wet mixture to form particles comprising the fertilizer material and the organic binder dispersed therein, and coating the dried particles with mineral oil to form coated particles. The solid particles of langbeinite comprise potassium sulfate and magnesium sulfate, and the organic binder comprises at least one cellulose polymer in a solid phase or a liquid gel phase.

Embodiment 2: The method of Embodiment 1, wherein the at least one cellulose polymer comprises a sodium cellulose polymer.

Embodiment 3: The method of Embodiment 2, wherein the at least one cellulose polymer comprises sodium carboxymethyl cellulose ether.

Embodiment 4: The method of any of Embodiments 1 through 3, wherein combining solid particles of langbeinite with an organic binder to form a wet mixture comprises forming a dry mixture of the solid particles of langbeinite and the organic binder and adding water to the dry mixture to form the wet mixture.

Embodiment 5: The method of Embodiment 4, wherein adding water comprises adding brine to the dry mixture.

Embodiment 6: The method of any of Embodiments 1 through 5, wherein combining solid particles of langbeinite with an organic binder to form a wet mixture comprises mixing the organic binder with water or brine.

Embodiment 7: The method of any of Embodiments 1 through 6, wherein combining solid particles of langbeinite with an organic binder to form a wet mixture comprises mixing the organic binder with a material selected from the group consisting of a sugar, a starch, and a compound comprising at least one ligand.

Embodiment 8: The method of any of Embodiments 1 through 7, wherein coating the dried particles with mineral oil comprises spraying the dried particles with mineral oil.

Embodiment 9: The method of any of Embodiments 1 through 8, wherein the organic binder comprises less than about 1.0% by weight of the coated particles.

Embodiment 10: The method of Embodiment 9, wherein the organic binder comprises less than about 0.5% by weight of the coated particles.

Embodiment 11: The method of any of Embodiments 1 through 10, wherein drying the wet mixture comprises evaporating water from the wet mixture.

Embodiment 12: The method of any of Embodiments 1 through 11, further comprising forming granules comprising the solid particles of langbeinite and the organic binder, the granules having a mean particle size from about 0.5 mm to about 10.0 mm.

Embodiment 13: The method of Embodiment 12, wherein the granules have a mean particle size from about 1.0 mm to about 5.0 mm.

Embodiment 14: The method of any of Embodiments 1 through 13, further comprising passing the wet mixture through a rotating drum.

Embodiment 15: The method of any of Embodiments 1 through 14, further comprising transferring the wet mixture to a pan pelletizer.

Embodiment 16: The method of any of Embodiments 1 through 15, wherein the fertilizer material comprises from about 90% by weight of the dried particles to about 97% by weight of the dried particles.

Embodiment 17: The method of Embodiment 16, wherein the fertilizer material comprises from about 92% by weight of the dried particles to about 95% by weight of the dried particles.

Embodiment 18: The method of any of Embodiments 1 through 17, wherein the weight of the mineral oil comprises from about 0.05% by weight of the dried particles to about 0.2% by weight of the coated particles.

Embodiment 19: A fertilizer material, comprising pellets comprising solid particles of langbeinite interspersed with at least one cellulose polymer and a mineral oil coating over the pellets.

Embodiment 20: The fertilizer material of Embodiment 19, wherein the at least one cellulose polymer comprises less than about 2% by weight of the fertilizer material.

Embodiment 21: A pelletized fertilizer, comprising a fertilizer material comprising solid particles of langbeinite that are comprised of potassium sulfate and magnesium sulfate and at least one cellulose polymer, wherein the fertilizer material is interspersed with the at least one cellulose polymer.

Embodiment 22: A fertilizer granule comprising solid particles of langbeinite, an organic binder, and a mineral oil coating over the fertilizer granule. The langbeinite comprises potassium sulfate and magnesium sulfate, and the organic binder comprises at least one cellulose polymer. The organic binder comprises less than about 2% by weight of the fertilizer granule.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various fertilizer types and formulations.

What is claimed is:

1. A method of forming a pelletized fertilizer, comprising:
    combining solid particles of langbeinite with an organic binder to form a wet mixture, wherein the organic binder comprises at least one cellulose polymer in a solid phase or a liquid gel phase;
    drying the wet mixture to form dried particles comprising the solid particles of langbeinite and the organic binder dispersed therein; and
    coating the dried particles with mineral oil to form coated particles, the langbeinite comprising greater than about 99.5 percent of the mass of the coated particles, the coating comprising from about 0.05 percent by weight to about 0.2 percent by weight of the coated particles.

2. The method of claim 1, wherein the at least one cellulose polymer comprises a sodium cellulose polymer.

3. The method of claim 2, wherein the organic binder comprises at least 99.5 percent sodium carboxymethyl cellulose ether on a dry basis.

4. The method of claim 1, wherein combining solid particles of langbeinite with an organic binder to form a wet mixture comprises:
    forming a dry mixture of the solid particles of langbeinite and the organic binder; and
    adding water to the dry mixture to form the wet mixture.

5. The method of claim 4, wherein adding water comprises adding brine to the dry mixture.

6. The method of claim 1, wherein combining solid particles of langbeinite with an organic binder to form a wet mixture comprises mixing the organic binder with water or brine.

7. The method of claim 1, wherein combining solid particles of langbeinite with an organic binder to form a wet mixture comprises mixing the organic binder with a material selected from the group consisting of a sugar, a starch, and a compound comprising at least one ligand.

8. The method of claim 1, wherein coating the dried particles with mineral oil comprises spraying the dried particles with mineral oil.

9. The method of claim 1, wherein drying the wet mixture comprises evaporating water from the wet mixture.

10. The method of claim 1, further comprising forming granules comprising the solid particles of langbeinite and the organic binder, the granules having a mean particle size from about 0.5 mm to about 10.0 mm.

11. The method of claim 10, wherein the granules have a mean particle size from about 1.0 mm to about 5.0 mm.

12. The method of claim 1, further comprising passing the wet mixture through a rotating drum.

13. The method of claim 1, further comprising transferring the wet mixture to a pan pelletizer.

14. The method of claim 1, wherein forming the coated particles comprises forming the coated particles to exhibit a multimodal grain size distribution comprising:
   first particles having an average particle dimension less than 1 µm;
   second particles having an average particle dimension less than 1 mm; and
   third particles having an average particle dimension less than 3 mm.

15. The method of claim 1, further comprising recycling, to the solid particles of langbeinite, a portion of the dried particles falling outside a predetermined size range.

16. The method of claim 15, further comprising crushing oversized dried particles in a crusher prior to recycling the portion of the dried particles.

17. A fertilizer material, comprising:
   pellets comprising solid particles of langbeinite interspersed with at least one cellulose polymer; and
   a coating comprising mineral oil coating the pellets, the langbeinite comprising greater than about 99.5 percent of the mass of the pellets, the coating comprising from about 0.05 percent by weight to about 0.2 percent by weight of the pellets.

18. The fertilizer material of claim 17, wherein the pellets comprise a multimodal grain size distribution comprising:
   first particles having an average particle dimension less than 1 µm;
   second particles having an average particle dimension less than 1 mm; and
   third particles having an average particle dimension less than 3 mm.

* * * * *